United States Patent
Tadano (10) Patent No.: US 12,023,747 B2
(45) Date of Patent: Jul. 2, 2024

(54) CUTTING MACHINE AND CUTTING METHOD

(71) Applicants: Amada Co., Ltd., Kanagawa (JP); Amada Machinery Co., Ltd., Kanagawa (JP)

(72) Inventor: Susumu Tadano, Kanagawa (JP)

(73) Assignees: AMADA CO., LTD., Kanagawa (JP); AMADA MACHINERY CO., LTD., Kanagawa (JP)

(*) Notice: Subject to any disclaimer, the term of this patent is extended or adjusted under 35 U.S.C. 154(b) by 211 days.

(21) Appl. No.: 17/788,617

(22) PCT Filed: Dec. 17, 2020

(86) PCT No.: PCT/JP2020/047113
§ 371 (c)(1),
(2) Date: Jun. 23, 2022

(87) PCT Pub. No.: WO2021/132004
PCT Pub. Date: Jul. 1, 2021

(65) Prior Publication Data
US 2023/0029802 A1 Feb. 2, 2023

(30) Foreign Application Priority Data
Dec. 27, 2019 (JP) .................. 2019-238739

(51) Int. Cl.
*B23D 36/00* (2006.01)
*B23D 47/04* (2006.01)
*B23D 59/00* (2006.01)

(52) U.S. Cl.
CPC ......... *B23D 36/0033* (2013.01); *B23D 47/04* (2013.01); *B23D 59/001* (2013.01)

(58) Field of Classification Search
CPC .. B23D 36/0033; B23D 47/04; B23D 59/001; B07C 5/36; B27B 1/002; B27B 31/00;
(Continued)

(56) References Cited

U.S. PATENT DOCUMENTS 3,870,774 A * 3/1975 Maroschak ............ B65G 47/82
425/DIG. 231
3,893,357 A * 7/1975 Zahlaus .................. B21C 51/00
83/210

(Continued)

FOREIGN PATENT DOCUMENTS

JP 5-8805 A 1/1993
JP 6-347222 A 12/1994
(Continued)

OTHER PUBLICATIONS

International Search Report for corresponding Application No. PCT/JP2020/047113, mailed Mar. 2, 2021.
(Continued)

*Primary Examiner* — Ghassem Alie
(74) *Attorney, Agent, or Firm* — Renner, Otto, Boisselle & Sklar, LLP (57) ABSTRACT

A cutting machine includes a cutting machine main body configured to cut a material transported along a longitudinal direction of a material into a plurality of cut materials, a material supply device and a product carrying-out device configured to carry the material into the cutting machine main body and to sort and carry out each of the plurality of cut materials into a product yard for accommodating a product or a residual material yard for accommodating a residual material of the material, respectively, and an NC device configured to control the cutting machine main body, the material supply device, and the product carrying-out device. The NC device is provided with a first operation (Continued)

mode for causing all of the plurality of cut materials to be carried out to the product yard 45.

6 Claims, 10 Drawing Sheets

(58) Field of Classification Search
CPC ......... B27B 5/29; B27B 29/02; B27B 31/003; B27B 31/02; B27B 31/08; B27B 5/228; B27F 1/55; B27C 5/14; Y10T 83/141; Y10T 83/04; Y10T 83/647; Y10T 83/0467; Y10T 83/54; Y10T 83/22
USPC ...................................................... 83/72, 364
See application file for complete search history.

(56) References Cited

U.S. PATENT DOCUMENTS

| | | | | |
|---|---|---|---|---|
| 4,120,333 | A | * | 10/1978 | Hellgren ................. B27B 5/228 144/242.1 |
| 4,887,219 | A | * | 12/1989 | Strauser ............... B23D 59/008 83/365 |
| 2003/0183052 | A1 | * | 10/2003 | Olsen ....................... B07C 5/14 83/13 |
| 2005/0262977 | A1 | * | 12/2005 | Wilkerson ........... B23D 47/042 83/425.2 |

FOREIGN PATENT DOCUMENTS

| | | | |
|---|---|---|---|
| JP | 2001-129720 A | 5/2001 | |
| JP | 2002-283130 A | 10/2002 | |
| JP | 2012-61532 | 3/2012 | |
| WO | WO-2019079728 A1 * | 4/2019 | ........... B23D 59/001 |

OTHER PUBLICATIONS

Written Opinion for corresponding Application No. PCT/JP2020/047113, mailed Mar. 2, 2021.

Extended European Search Report for corresponding EP Application No. 20905186.1 dated Jan. 3, 2023.

* cited by examiner

CUTTING MACHINE AND CUTTING METHOD

TECHNICAL FIELD

The present disclosure relates to a cutting machine and a cutting method.

BACKGROUND ART

Patent Literature 1 discloses a cutting machine that cuts out a product having a predetermined product length from a long material. This cutting machine can cut one material into a plurality of cut materials by repeating a transporting step of transporting the material by a predetermined length with a feed vise and a cutting step of cutting the material at a predetermined position. The plurality of cut materials include a cut material corresponding to the product length and a cut material corresponding to the remaining portion of the material.

CITATION LIST

Patent Literature

Patent Literature 1: Japanese Patent Application Laid-Open Publication No. 2012-61532

SUMMARY

Now, when the plurality of cut materials are carried out from the cutting machine main body, the cut material corresponding to the product length and the cut material corresponding to the remaining portion of the material may be separately sorted into different yards. Therefore, working efficiency may decrease when it is requested to handle all of the plurality of cut materials in a collective manner.

The present disclosure has been made in view of such a problem, and an object thereof is to provide a cutting machine and a cutting method capable of handling all of a plurality of cut materials in a collective manner and thereby improving working efficiency.

In order to solve such a problem, a first aspect of one or more embodiments is a cutting machine for cutting out a product having a predetermined product length from a material, the cutting machine including a cutting machine main body configured to cut the material transported along a longitudinal direction of the material into a plurality of cut materials, a transport device configured to carry the material into the cutting machine main body and to sort and carry out each of the plurality of cut materials into any yard of a plurality of yards, and a control device configured to control the cutting machine main body and the transport device, and the control device is provided with a first operation mode for causing all of the plurality of cut materials to be carried out to a same yard.

Further, a second aspect of the one or more embodiments is a cutting method of cutting out a product having a predetermined product length from a material by using a cutting machine, the cutting method including a first step of cutting, by the cutting machine, the material transported along a longitudinal direction of the material, and a second step of sorting and carrying out, by the cutting machine, a cut material cut from the material into any yard of a plurality of yards, and when a predetermined first operation mode is selected, the second step causes all of a plurality of cut materials cut from the material to be carried out to a same yard.

According to the present disclosure, since all of the plurality of cut materials can be handled in a collective manner, working efficiency can be improved.

DESCRIPTION OF EMBODIMENTS

Hereinafter, a cutting machine and a cutting method according to the present embodiment will be described with reference to the attached drawings. First, with reference to FIG. 1, an overall configuration of the cutting machine will be described. A cutting machine 1 is a processing device that cuts out a product having a predetermined product length from a material (workpiece). In the present embodiment, a long material having a length along a predetermined direction will be described as an example. The cutting machine 1 is mainly composed of a cutting machine main body 10, a material supply device 20, and a product carrying-out device 40.

Figure 1:
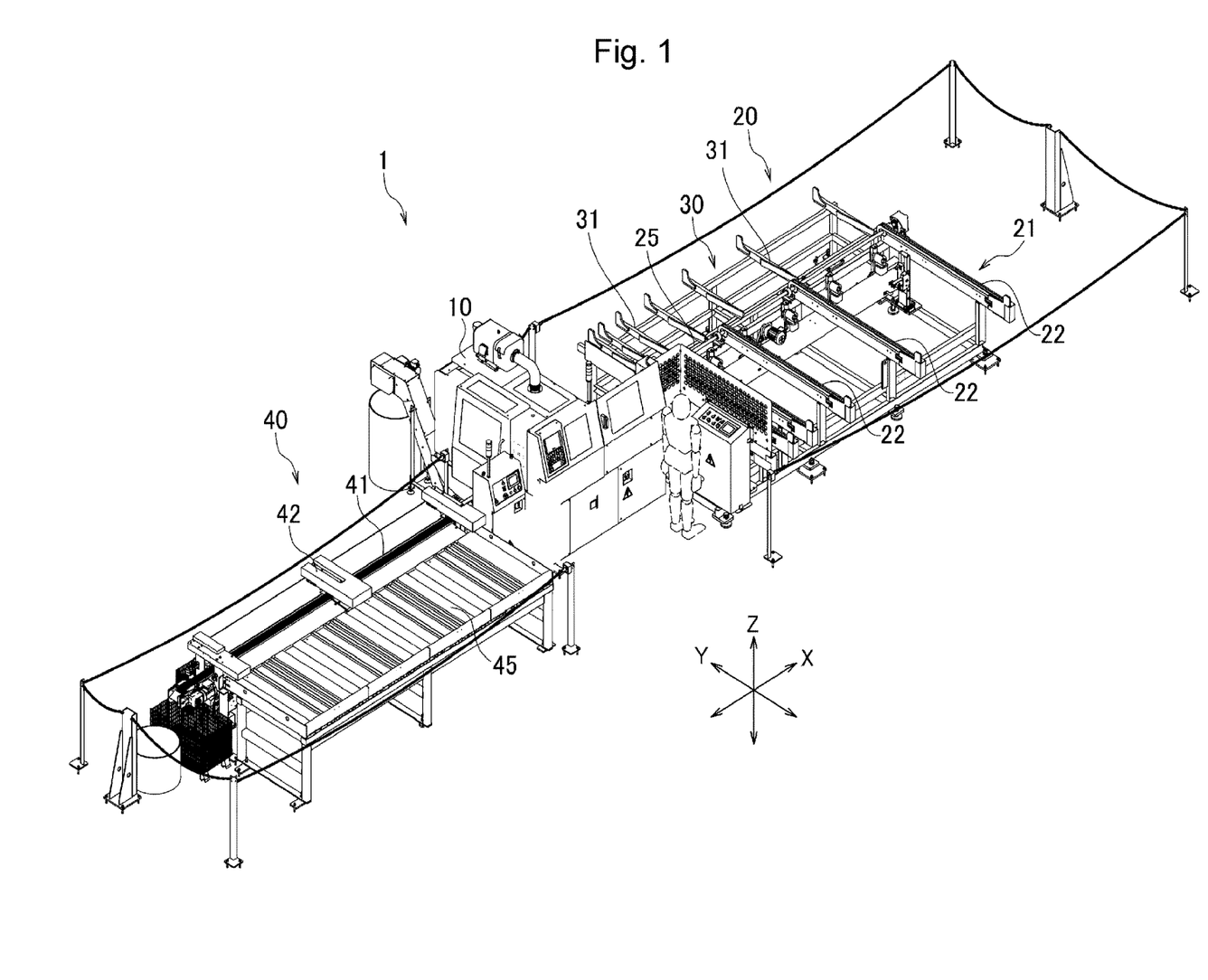
FIG. 1 is a perspective view showing an overall configuration of a cutting machine according to the present embodiment.

The cutting machine main body 10 transports the material along the longitudinal direction, and performs cutting processing to a part to be cut of the material positioned at a cutting position in the transport direction (X direction (from the right side to the left side in the figure)). The cutting machine main body 10 performs a plural number of cutting processing to the material by repeating the transportation and the positioning. One material is cut into a plurality of cut materials by the plural number of cutting processing. Hereinafter, the terms a downstream side and an upstream side are used with reference to the transport direction of the material.

The cutting machine main body 10 is, for example, a circular saw machine. The circular saw machine is provided with a processing head configured to freely advance and retreat in a direction orthogonal to the longitudinal direction of the material. The processing head is arranged at the cutting position in the cutting machine main body 10, and a circular saw blade for cutting the material is rotatably provided at the processing head. The circular saw machine is provided with a vise mechanism that grips the material supplied from the material supply device 20, feeds the material in the transport direction, and positions the material with respect to the cutting position.

In the circular saw machine, the cutting processing is performed by advancing the processing head to the material positioned by the vise mechanism. With one cutting processing, the material is cut into a cut material located on the downstream side of the cutting position (the processing head) and a cut material located on the upstream side of the cutting position (that is, the remaining portion of the material from which the cut material on the downstream side is cut). Further, by positioning the remaining portion of the material again and advancing the processing head, the remaining portion of the material is cut into a cut material located on the downstream side of the cutting position and a cut material located on the upstream side of the cutting position. In this manner, with the plural number of cutting processing, one material is cut into a plurality of cut materials.

Instead of the circular saw machine, the cutting machine main body 10 may be a saw cutting machine including a band saw machine that performs processing with a band saw blade. Further, the cutting machine main body 10 may be a laser processing machine that performs laser processing.

The material supply device 20 is a transport device that carries the material into the cutting machine main body 10. The material supply device 20 is arranged on the upstream side of the cutting machine main body 10, that is, on one side in the X direction (on the right side in FIG. 1). The material supply device 20 is provided with a material supply yard 21 and a carrying-in conveyor 25.

The material supply yard 21 stores the material and supplies the material to the carrying-in conveyor 25. The material supply yard 21 transports the material placed in a state parallel to the carrying-in conveyor 25 in a direction orthogonal to the longitudinal direction of the material (in the Y direction) so as to supply the material to the carrying-in conveyor 25.

The material supply yard 21 is configured by arranging a plurality of supply conveyors 22, each extending in the Y direction, at regular intervals in the X direction. Each of the supply conveyors 22 is provided with an endless transport chain. The transport chain is rotationally driven by a motor and is configured to freely travel in the Y direction. The material transported toward the carrying-in conveyor 25 by each of the plurality of supply conveyors 22 is lifted by a material transport means and transferred to the carrying-in conveyor 25.

When the material is transported from the material supply yard 21, the carrying-in conveyor 25 carries the material into the cutting machine main body 10. The carrying-in conveyor 25 transports the material in a direction in which the longitudinal direction of the material coincides with the transport direction. The carrying-in conveyor 25 is composed of, for example, a roller conveyor, and is provided with a plurality of transport rollers that can be rotated by driving a motor. By causing each of the transport rollers to rotate in the forward direction (the transport direction), the material can be transported from the upstream side to the downstream side. Further, by switching the drive direction of the motor and causing each of the transport rollers to rotate in the backward direction, the material can be transported from the downstream side to the upstream side.

Further, the material supply device 20 is provided with a residual material yard 30. The residual material yard 30 is a place for storing a residual material from among the cut materials cut by the cutting machine main body 10. The residual material is a cut material corresponding to the remaining portion of the material from which one or more products have been cut out, and refers to a cut material that does not function as a product. The residual material is generated in normal cutting processing that will be described later. Generally, the residual material is a cut material that does not correspond to a product length of the product. Particularly, in a processing mode for causing the products to be sequentially cut out from the material, the cut material located on the upstream side of the cutting position of the cutting machine main body 10 after final processing is handled as the residual material.

The residual material yard 30 is arranged in such a manner as to face the material supply yard 21 through the carrying-in conveyor 25. The residual material yard 30 is configured by arranging a plurality of mounting base frames 31, each extending in the Y direction, at regular intervals in the X direction. Each of the mounting base frames 31 has an inclined shape such that the height in the Z direction (the height direction) decreases from a frame base end portion adjacent to the carrying-in conveyor 25 toward a frame tip end.

Note that when the residual material is carried out by a conventional method after the product is cut, the residual material is fed from the cutting machine main body 10 to the upstream side, and the respective transport rollers constituting the carrying-in conveyor 25 are rotated in the backward direction to transport the residual material from the downstream side to the upstream side. When the residual material transported in the backward direction reaches a predetermined position of the carrying-in conveyor 25, the residual material slides down along the mounting base frame 31. The residual material is stopped by a stopper located at the tip end of the mounting base frame 31, thereby being retained by the mounting base frame 31.

The product carrying-out device 40 is a transport device that carries out the cut material corresponding to the product from among the cut materials cut by the cutting machine main body 10. The product carrying-out device 40 is arranged on the downstream side of the cutting machine main body 10, that is, on the other side in the X direction (on the left side in FIG. 1). The product carrying-out device 40 is provided with a carrying-out conveyor 41, a pusher 42, and a product yard 45.

The carrying-out conveyor 41 transports the cut material fed from the cutting machine main body 10 to the downstream side. The carrying-out conveyor 41 is composed of a chain conveyor. The carrying-out conveyor 41 is provided with an endless transport chain extending in the transport direction, and the transport chain is rotationally driven by a motor and is configured to freely travel in the X direction.

The pusher 42 is provided substantially in the center of the carrying-out conveyor 41 in the transport direction, and is configured to freely advance and retract in the Y direction. An actuator such as an air cylinder is attached to the pusher 42. When the actuator is driven to cause the pusher 42 to advance, the cut material transported on the carrying-out conveyor 41 can be pushed out to the product yard 45. On the other hand, when the actuator is driven to cause the pusher 42 to retract, the pusher evacuates from the carrying-out conveyor 41, and the cut material can be transported to the downstream side by the carrying-out conveyor 41.

The product yard 45 is a place for storing the cut material corresponding to the product, and is arranged adjacent to the carrying-out conveyor 41. The product yard 45 is composed of a mounting base for accommodating the cut material pushed out by the pusher 42.

Figure 2:
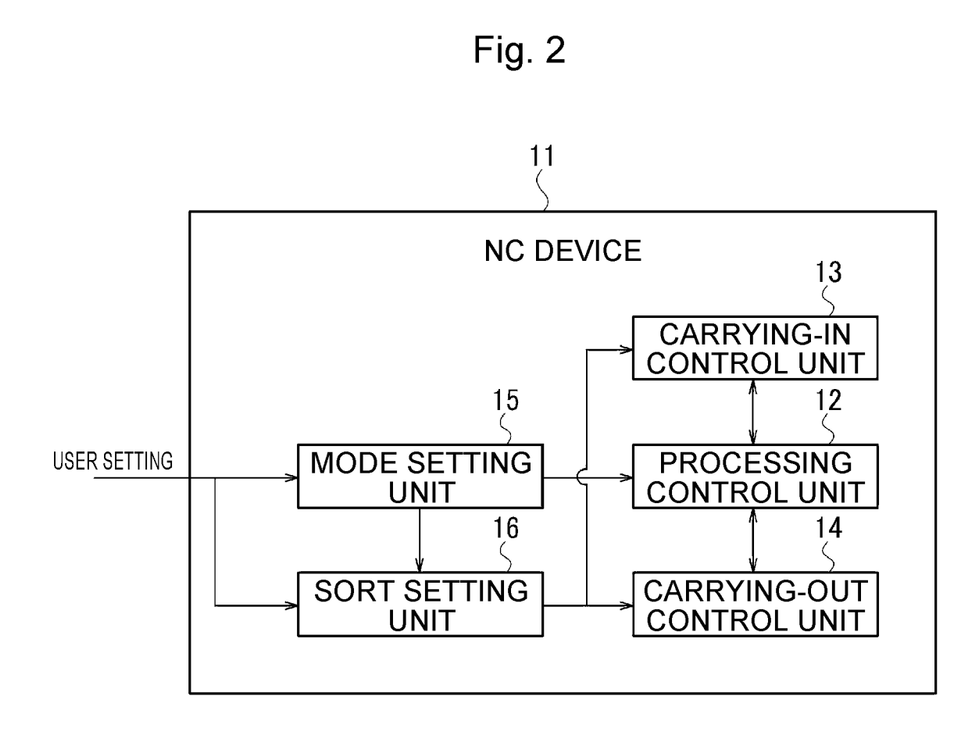
FIG. 2 is a block diagram showing a configuration of an NC device.

The configuration of an NC device 11 provided at the cutting machine 1 will be described with reference to FIG. 2. The NC device 11 is a control device that controls the cutting machine 1 based on a processing program. The NC device 11 is composed of a computer including a CPU, a ROM, a RAM, and the like.

The NC device 11 realizes various functions when the CPU reads out various programs from the ROM, expands the read programs into the RAM, and executes the expanded programs. The NC device 11 has functions as a processing control unit 12, a carrying-in control unit 13, a carrying-out control unit 14, a mode setting unit 15, and a sort setting unit 16.

The processing control unit 12 controls the processing head and the vise mechanism to control the cutting processing of the cutting machine main body 10. The processing control unit 12 positions the material with respect to the cutting position in the transport direction (the X direction), and performs the cutting processing to the part to be cut of the material. The processing control unit 12 cuts one material into a plurality of cut materials by repeating the positioning and the cutting processing of the material.

The carrying-in control unit 13 controls the material supply device 20. The carrying-in control unit 13 controls the supply conveyor 22 and the carrying-in conveyor 25 to supply the material from the material supply yard 21 to the cutting machine main body 10.

Further, the carrying-in control unit 13 controls the carrying-in conveyor 25 to transport, to the residual material yard 30, a cut material corresponding to the residual material from among the cut materials cut by the cutting machine main body 10.

The carrying-out control unit 14 controls the product carrying-out device 40. The carrying-out control unit 14 controls the carrying-out conveyor 41 to transport, to the product yard 45, a cut material corresponding to the product from among the cut materials cut by the cutting machine main body 10.

The mode setting unit 15 sets an operation mode of the cutting machine 1. The operation modes include a first operation mode and a second operation mode. The first operation mode is a mode to be set when equal division cutting processing, in which all of the plurality of cut materials are cut out as products, is performed by cutting one material into equal divisions. This equal division cutting processing is a cutting that cuts the material into substantially equal divisions, and each product is allowed an error with respect to the product length. On the other hand, the second operation mode is a mode to be set when normal cutting processing, in which the cut material corresponding to the product length is cut out as a product, is performed by cutting the material according to the product length of the product. In this normal cutting processing, the remaining portion of the material, from which the cut material corresponding to the product length (the product) has been cut out, is cut out as a residual material.

The mode setting unit 15 can select and execute either one of the two operation modes according to a user setting that is input from an operation panel of the NC device 11 and the like.

The sort setting unit 16 determines whether the cut material cut by the cutting machine main body 10 is sorted into the product yard 45 or the residual material yard 30. In the case of the first operation mode, the sort setting unit 16 sorts all of the plurality of cut materials cut by the cutting machine main body 10 into the product yard 45. On the other hand, in the case of second operation mode, the sort setting unit 16 sorts, into the product yard 45, the cut material corresponding to the product from among the plurality of cut materials cut by the cutting machine main body 10, and sorts the cut material corresponding to the residual material into the residual material yard 30.

Figure 3:
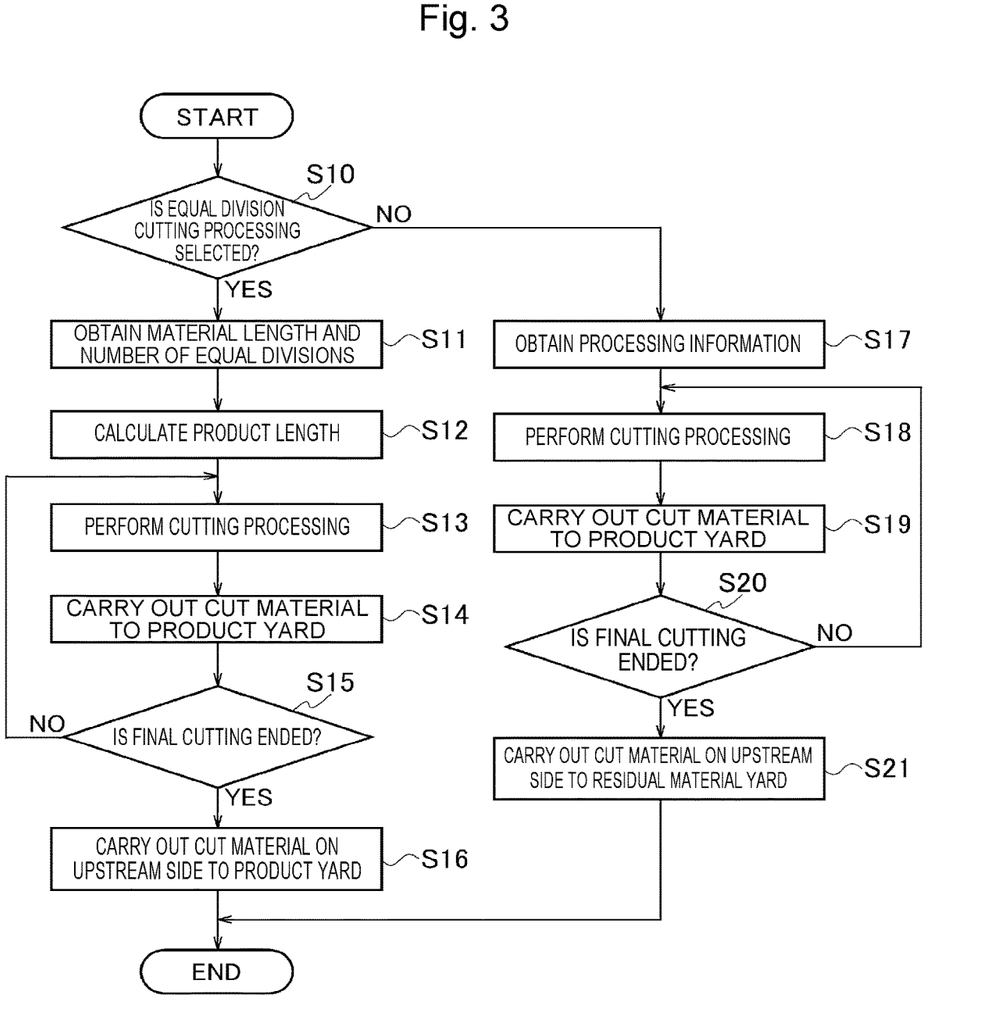
FIG. 3 is a flowchart showing a flow of a cutting operation.

Hereinafter, the cutting method that is an operation of the cutting machine 1 will be described with reference to FIGS. 3 to 8. The operation of the cutting machine 1 shown in FIG. 3 is executed by using, as a trigger, an instruction to the cutting machine 1 to start.

In step S10, the mode setting unit 15 refers to the user setting and determines whether or not the equal division cutting processing is selected. When the equal division cutting processing is selected, the process proceeds to step S11. In this case, the cutting machine 1 operates in the first operation mode. On the other hand, when the equal division cutting processing is not selected, that is, when the normal cutting processing is selected, the process proceeds to step S17 that will be described later. In this case, the cutting machine 1 operates in the second operation mode.

Figure 4:
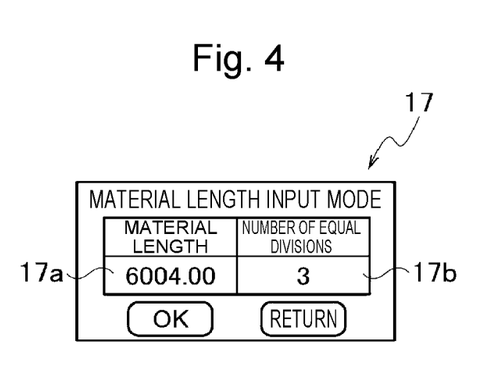
FIG. 4 is an explanatory diagram showing an input screen for a material length and a number of equal divisions.

In step S11, the mode setting unit 15 obtains a material length indicating a length of the material and the number of equal divisions into which the material is equally divided. As shown in FIG. 4, the mode setting unit 15 displays an input screen 17 provided with input units 17a and 17b for inputting the material length and the number of equal divisions on the operation panel of the NC device 11. The mode setting unit 15 obtains the material length and the number of equal divisions based on the input to the input screen 17.

In step S12, the mode setting unit 15 calculates the product length. When the material length is L, the number of equal divisions is n, and a cutting margin is a, the product length l is expressed by the following expression.

$$l=(L-a\times(n-1))/n \qquad \text{(Expression 1)}$$

In the following description, the material length L is 6050 mm, the number of equal divisions n is 3, and the cutting margin a is 2 mm. According to Expression 1, the product length l is 2015.3 mm. The information on the number of equal divisions n and the product length l is provided to the processing control unit 12.

Figure 5:
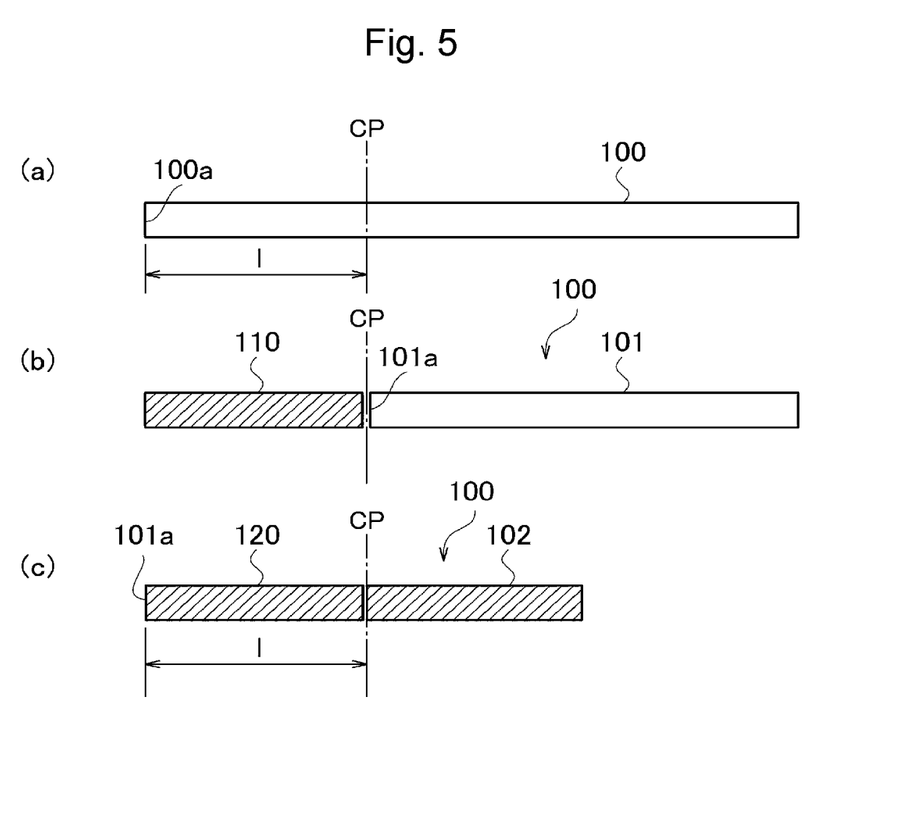
FIG. 5 is an explanatory diagram showing a concept of an operation of a first operation mode.

In step S13, the processing control unit 12 controls the cutting machine main body 10 based on the number of equal divisions n and the product length l so that the cutting machine main body 10 perform the cutting processing to the material. Specifically, as shown in FIG. 5, the processing control unit 12 transports, along the longitudinal direction, a material 100 received from the carrying-in conveyor 25. The processing control unit 12 positions a position (a part to be cut) offset from a tip end 100a on the downstream side of the material 100 to the upstream side by the product length l with respect to a cutting position CP of the cutting machine main body 10 ((a) in FIG. 5). When the positioning is completed, the processing control unit 12 performs the cutting processing to the part to be cut of the material 100. As a result, the material 100 is cut into a cut material 110 corresponding to the product length l and a cut material 101 corresponding to the remaining portion of the material 100 ((b) in FIG. 5).

In step S14, the sort setting unit 16 sets the product yard 45 as a sorting destination of the cut material 110 located on the downstream side of the cutting position CP of the cutting machine main body 10. The setting information of the sort setting unit 16 is carried out to the carrying-out control unit 14. As a result, the carrying-out control unit 14 controls the product carrying-out device 40 to carry out the cut material 110 to the product yard 45.

In step S15, the sort setting unit 16 determines whether or not final cutting is ended. The final cutting means a last cutting from among the cuttings necessary for the n equal divisions, and corresponds to the n-1th cutting. When the final cutting is ended, an affirmative determination is made in step S15, and the process proceeds to step S16.

On the other hand, when the final cutting is not ended, a negative determination is made in step S15, and the process returns to step S13. Then, the processing of steps S13 and S14 is repeated as many times as necessary for the n equal divisions.

The processing control unit 12 transports, along the longitudinal direction, the cut material 101 located on the upstream side of the cutting position CP of the cutting machine main body 10, that is, the remaining portion of the material 100 after the first cutting. The processing control unit 12 positions a position (a part to be cut) offset from a tip end 101a on the downstream side of the cut material 101 to the upstream side by the product length l with respect to the cutting position CP of the cutting machine main body 10, so as to perform the cutting processing to the part to be cut of the material 100. As a result, the material 100 is cut into a second cut material 120 corresponding to the product length l and a cut material 102 corresponding to the remaining portion of the material 100 ((c) in FIG. 5).

The sort setting unit 16 sets the product yard 45 as a sorting destination of the cut material 120 located on the downstream side of the cutting position CP of the cutting machine main body 10. The setting information of the sort setting unit 16 is carried out to the carrying-out control unit 14. The carrying-out control unit 14 controls the product carrying-out device 40 to carry out the cut material 120 to the product yard 45.

In step S16, the sort setting unit 16 sets the product yard 45 as a sorting destination of the cut material 102 located on the upstream side of the cutting position CP of the cutting machine main body 10. The setting information of the sort setting unit 16 is carried out to the carrying-out control unit 14. As a result, the carrying-out control unit 14 controls the product carrying-out device 40 to carry out the cut material 102 to the product yard 45.

Figure 6:
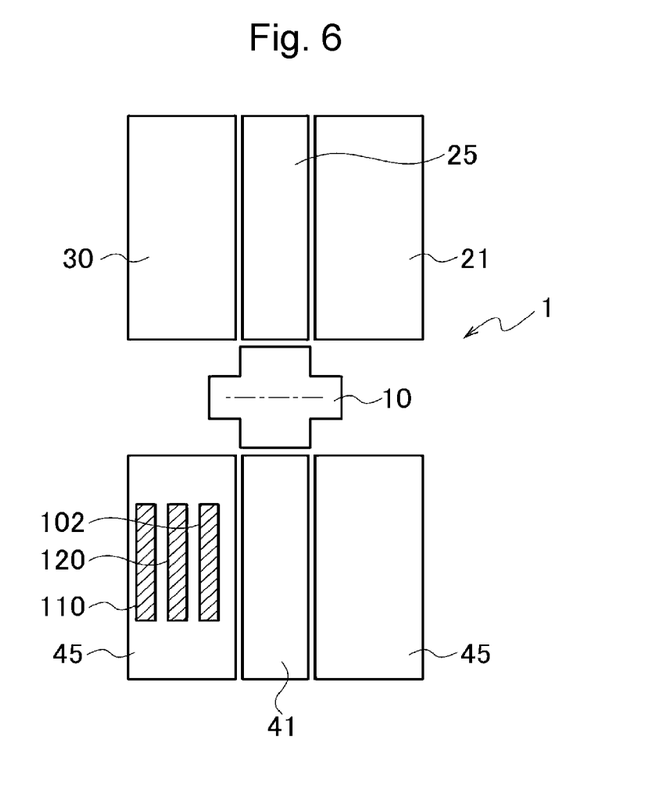
FIG. 6 is an explanatory diagram showing a carried-out result by the first operation mode.

In this manner, when the equal division cutting processing is performed, the NC device 11 executes the first operation mode. In the equal division cutting processing, all of the three cut materials 102, 110, and 120 are cut out as products. As shown in FIG. 6, of the three cut materials 102, 110 and 120, the two cut materials 110 and 120 corresponding to the product length 1 are carried out to the product yard 45, and the last one cut material 103 is carried out to the residual material yard 30. In the example described above, all of the lengths of the three cut materials 102, 110 and 120 correspond to the product length l (2015.3 mm).

Note that when the material length is input, the material length L based on a rough value may be input instead of the accurate material length L (6050 mm). For example, when the material length L is 6000 mm, the calculated product length l is 1998.7 mm. In this case, the two cut materials 110 and 120 corresponding to the product length l and the one cut material 102 having a length (2048.7 mm) deviated from the product length l are obtained. Then, all of these cut materials 102, 110, and 120 are cut out as products and carried out to the product yard 45. That is, the product length that is cut for equal division may include an allowable error.

On the other hand, in step S17, the mode setting unit 15 obtains the product length l that is processing information.

Figure 7:
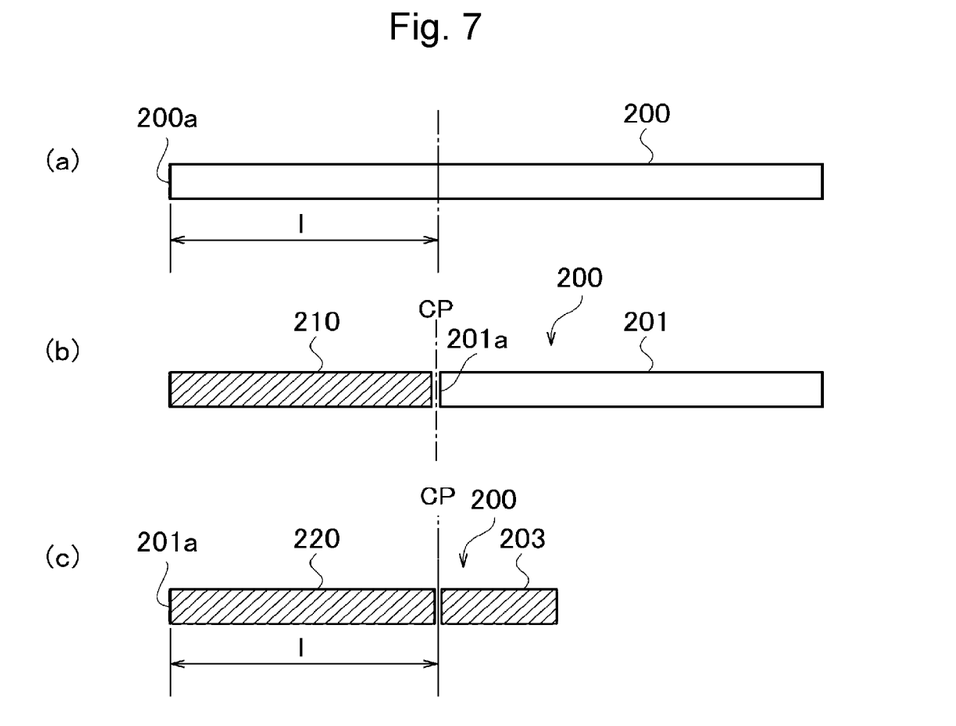
FIG. 7 is an explanatory diagram showing a concept of an operation of a second operation mode.

In step S18, the processing control unit 12 controls the cutting machine main body 10 based on the product length l so that the cutting machine main body 10 performs the cutting processing to the material. As shown in FIG. 7, the processing control unit 12 transports, along the longitudinal direction, a material 200 received from the carrying-in conveyor 25. The processing control unit 12 positions a position (a part to be cut) offset from a tip end 200a on the downstream side of the material 200 to the upstream side by the product length l with respect to the cutting position CP of the cutting machine main body 10 ((a) in FIG. 7). When the positioning is completed, the processing control unit 12 performs the cutting processing to the part to be cut of the material 200. As a result, the material 200 is cut into a cut material 210 corresponding to the product length l and a cut material 201 corresponding to the remaining portion of the material 200 ((b) in FIG. 7).

In step S19, the sort setting unit 16 sets the product yard 45 as a sorting destination of the cut material 210 located on the downstream side of the cutting position CP of the cutting machine main body 10. The setting information of the sort setting unit 16 is carried out to the carrying-out control unit 14. As a result, the carrying-out control unit 14 controls the product carrying-out device 40 to carry out the cut material 210 to the product yard 45.

In step S20, the sort setting unit 16 determines whether or not the final cutting is ended. The final cut is a last cutting by which the product can be cut from the material 200 and is determined, for example, based on the length of the remaining portion of the material 200. When the final cutting is ended, an affirmative determination is made in step S20, and the process proceeds to step S21.

On the other hand, when the final cutting is not ended, a negative determination is made in step S20, and the process returns to step S18. Then, the processing of steps S18 and S19 is repeated until the final cutting is reached.

The processing control unit 12 transports, along the longitudinal direction, the cut material 201 located on the upstream side of the cutting position CP of the cutting machine main body 10, that is, the remaining portion of the material 200 after the first cutting. The processing control unit 12 positions a position (a part to be cut) offset from a tip end 201a on the downstream side of the cut material 201 to the upstream side by the product length l with respect to the cutting position CP of the cutting machine main body 10, and performs the cutting processing to the part to be cut of the material 100 200. As a result, the material 200 is cut into a second cut material 220 corresponding to the product length l and a cut material 203 corresponding to the remaining portion of the material 200 ((c) in FIG. 7).

The sort setting unit 16 sets the product yard 45 as a sorting destination of the cut material 220 located on the downstream side of the cutting position CP of the cutting machine main body 10. The setting information of the sort setting unit 16 is carried out to the carrying-out control unit 14. The carrying-out control unit 14 controls the product carrying-out device 40 to carry out the cut material 220 to the product yard 45. Then, when the length of the cut material 203 corresponding to the remaining portion of the material 200 satisfies a specified requirement, it is determined that the final cutting is ended. The sort setting unit 16 recognizes, as the residual material, the cut material 203 on the upstream side of the cutting position CP of the cutting machine main body 10, that is, the cut material 203 that does not correspond to the product length l.

In step S21, the sort setting unit 16 sets the residual material yard 30 as a sorting destination of the cut material 203 located on the upstream side of the cutting position CP of the cutting machine main body 10. The setting information of the sort setting unit 16 is supplied to the carrying-in control unit 13. As a result, the carrying-in control unit 13 controls the material supply device 20 to carry out the cut material 203 to the residual material yard 30.

Figure 8:
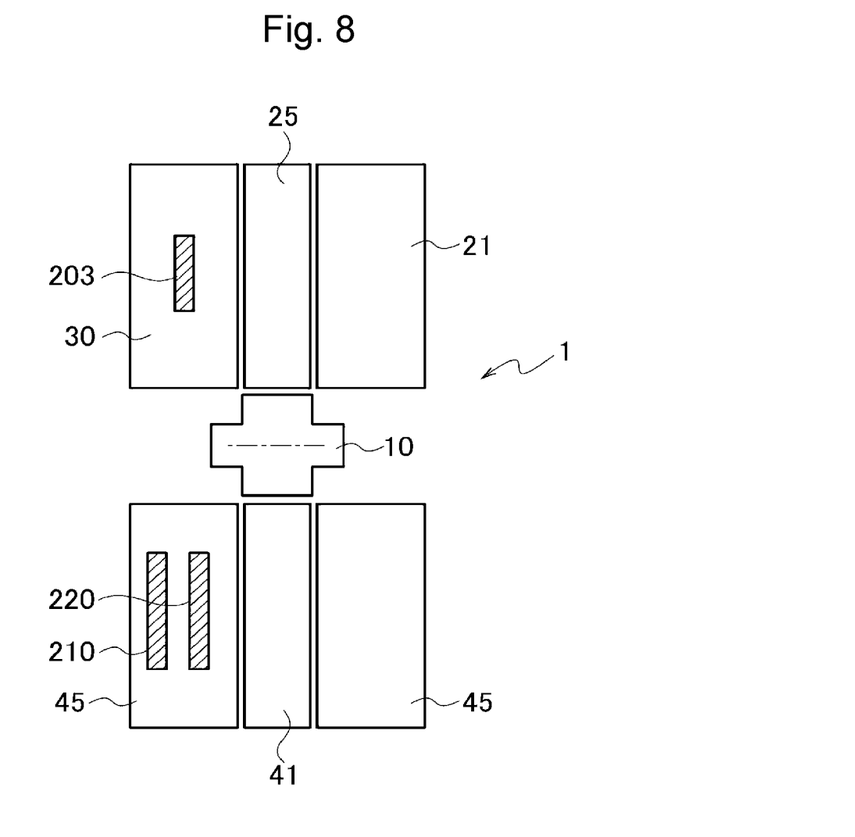
FIG. 8 is an explanatory diagram showing a carrying-out result by the second operation mode.

In this manner, when the normal cutting processing is performed, the NC device 11 executes the second operation mode. In the normal cutting processing, the cut materials 210 and 220 corresponding to the product length l are cut out as products. Further, the remaining portion of the material 200 from which the cut materials 210 and 220 (the products) corresponding to the product length l have been cut out, that is, the cut material 203 is cut out as the residual material. As shown in FIG. 8, of the three cut materials 203, 210 and 220, the two cut materials 210 and 220 corresponding to the product length l are carried out to the product yard 45, and the last one cut material 203 is carried out to the residual material yard 30.

As described above, the cutting machine 1 according to the present embodiment includes the cutting machine main body 10 configured to cut the material transported along the longitudinal direction of the material into the plurality of cut materials, the material supply device 20 and the product carrying-out device 40 configured to carry the material into the cutting machine main body 10 and to sort and carry out each of the plurality of cut materials into the product yard 45 for accommodating the product or the residual material yard 30 for accommodating the residual material of the material, respectively, and the NC device 11 configured to control the cutting machine main body 10, the material supply device 20, and the product carrying-out device 40. The NC device 11 is provided with the first operation mode for causing all of the plurality of cut materials to be carried out to the product yard 45.

According to this configuration, all of the plurality of cut materials can be sorted in the same place. As a result, all of the plurality of cut materials can be handled in a collective manner. This makes it possible to improve working efficiency in various operations such as a crane operation from the product yard 45 to a shipping yard.

In the present embodiment, the NC device 11 operates in the first operation mode when the equal division cutting processing of cutting out the plurality of cut materials as a plurality of products is performed by cutting the material into equal divisions (substantially equal divisions) each including the allowable error.

In the equal division cutting processing, all of the plurality of cut materials cut from the material are used as products. For this reason, it is necessary to sort, as the product, the cut material that is usually handled as the residual material. In this regard, according to the present embodiment, by operating in the first operation mode, the plurality of cut materials to be used as products can be handled in a collective manner. As a result, working efficiency can be improved.

When the equal division cutting processing is performed, the NC device 11 obtains the material length that is the length of the material, and the number of equal divisions into which the material is cut. Then, the NC device 11 calculates the product length based on the material length and the number of equal divisions. Further, the NC device 11 cuts out n-1 (n: the number of equal divisions) cut materials corresponding to the product length from the material, and carries out, to the product yard, the n-1 cut materials corresponding to the product length and the cut material corresponding to the remaining portion of the material from which the n-1 cut materials have been cut out.

When the equal division cutting processing is performed, the n-1 cut materials corresponding to the product length and the cut material corresponding to the remaining portion of the material are cut out as products. According to the first operation mode, all of the cut materials including the cut material corresponding to the remaining portion of the material can be sorted into the same place. As a result, all of the plurality of cut materials can be handled in a collective manner, thereby making it possible to improve working efficiency.

In the present embodiment, the cut material corresponding to the remaining portion of the material from which the n-1 cut materials have been cut out is a cut material located on the upstream side of the cutting position of the cutting machine main body 10 after the final cutting of the material.

According to this configuration, all of the cut materials can be sorted into the same place without causing the cut material after the final cutting to be sorted into the residual material yard 30 as the residual material. As a result, all of the plurality of cut materials can be handled in a collective manner, thereby making it possible to improve working efficiency.

Further, in the present embodiment, the NC device 11 is further provided with the second operation mode, and switches between the first operation mode and the second operation mode for execution. Here, in the second operation mode, from among the plurality of cut materials, the cut material corresponding to the product length is carried out to the product yard 45, and the cut material corresponding to the remaining portion of the material from which the cut material corresponding to the product length has been cut out is carried out to the residual material yard 30.

Since the cut material corresponding to the product length is carried out to the product yard 45, the cut material corresponding to the product can be collected in the product yard 45 from among the plurality of cut materials. Further, since the cut material corresponding to the remaining portion of the material is carried out to the residual material yard 30, the cut material corresponding to the residual material can be collected in the residual material yard from among the plurality of cut materials. As a result, the product and the residual material can be sorted, thereby making it possible to prevent the product and the residual material from being stored together.

Further, since it is possible to select between the first operation mode and the second operation mode, the cutting machine 1 having various operations can be provided.

Note that in the embodiment described above, when the equal division cutting processing is performed, the NC device 11 (the mode setting unit 15) obtains the material length indicating the length of the material and the number of equal divisions into which the material is equally divided. However, the mode setting unit 15 may obtain the product length and the number of pieces. Hereinafter, the details of the equal division cutting processing that uses the product length and the number of pieces will be described.

Figure 9:
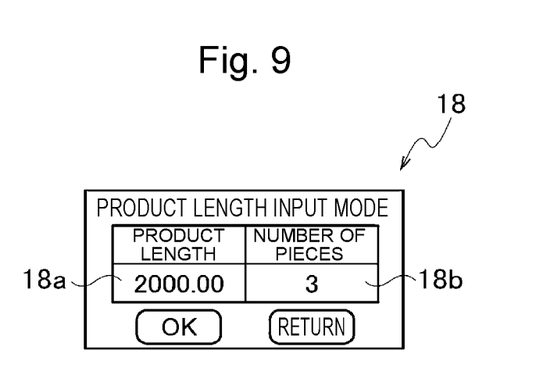
FIG. 9 is an explanatory diagram showing an input screen for a product length and a number of pieces.

First, as shown in FIG. 9, the mode setting unit 15 displays an input screen 18 provided with input units 18a and 18b for inputting the product length and the number of pieces on the operation panel of the NC device 11. The mode setting unit 15 receives an input to the input screen 17 and obtains the product length l and the number of pieces n. The information on the product length l and the number of pieces n is provided to the processing control unit 12.

In the following description, the material length L is 6050 mm and the cutting margin a is 2 mm. Further, the product length l is 2000 mm and the number of pieces n is 3. The information on the product length l and the number of pieces n is provided to the processing control unit 12.

Figure 10:
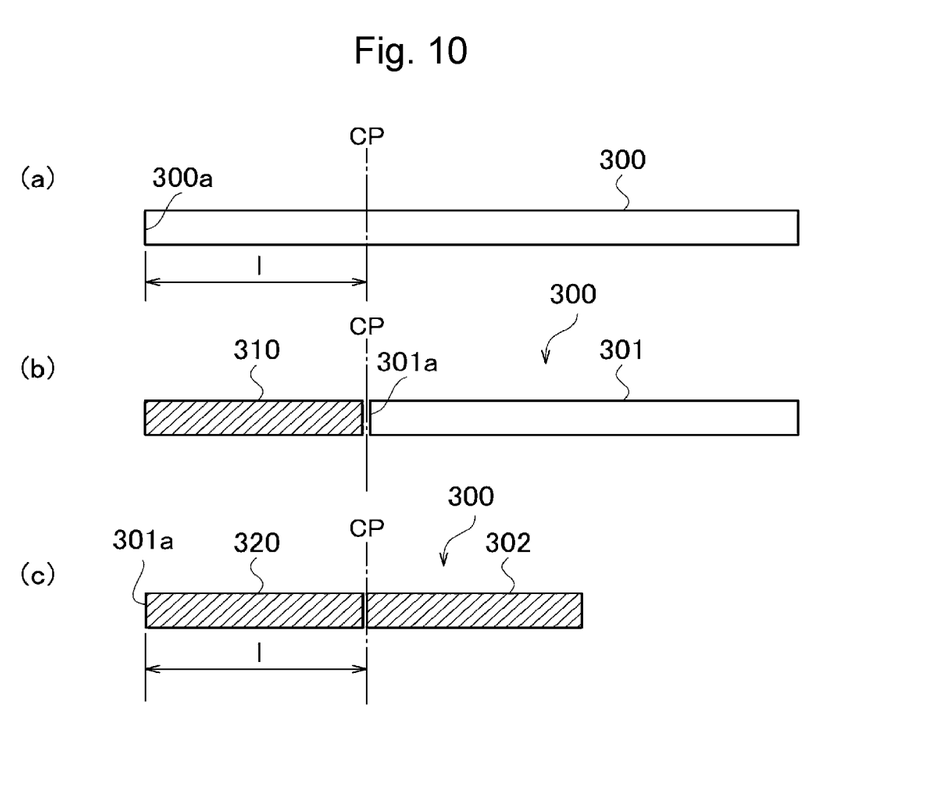
FIG. 10 is an explanatory diagram showing the concept of the operation of the first operation mode.

The processing control unit 12 controls the cutting machine main body 10 based on the product length l and the number of pieces n so that the cutting machine main body 10 performs the cutting processing to the material. Specifically, as shown in FIG. 10, the processing control unit 12 transports, along the longitudinal direction, a material 300 received from the carrying-in conveyor 25. The processing control unit 12 positions a position (a part to be cut) offset from a tip end 300a on the downstream side of the material 300 to the upstream side by the product length l with respect to the cutting position CP of the cutting machine main body 10 ((a) in FIG. 10). When the positioning is completed, the processing control unit 12 performs the cutting processing to the part to be cut of the material 300. As a result, the material 300 is cut into a cut material 310 corresponding to the product length l and a cut material 301 corresponding to the remaining portion of the material 300 ((b) in FIG. 10).

The sort setting unit 16 sets the product yard 45 as a sorting destination of the cut material 310 located on the downstream side of the cutting position CP of the cutting machine main body 10. The setting information of the sort setting unit 16 is carried out to the carrying-out control unit 14. As a result, the carrying-out control unit 14 controls the product carrying-out device 40 to carry out the cut material 310 to the product yard 45.

The processing control unit 12 transports, along the longitudinal direction, the cut material 301 located on the upstream side of the cutting position CP of the cutting machine main body 10, that is, the remaining portion of the material 300 after the first cutting. The processing control unit 12 positions a position (a part to be cut) offset from a tip end 301a on the downstream side of the cut material 301 to the upstream side by the product length l with respect to the cutting position CP of the cutting machine main body 10, so as to perform the cutting processing to the part to be cut of the material 300. As a result, the material 300 is cut into a second cut material 320 corresponding to the product length l and a cut material 302 corresponding to the remaining portion of the material 300 ((c) in FIG. 10).

The sort setting unit 16 sets the product yard 45 as a sorting destination of the cut material 320 located on the downstream side of the cutting position CP of the cutting machine main body 10. The setting information of the sort setting unit 16 is carried out to the carrying-out control unit 14. The carrying-out control unit 14 controls the product carrying-out device 40 to carry out the cut material 320 to the product yard 45.

Further, when the sort setting unit 16 determines that the final cutting is ended from among the necessary cuttings for the number of equal divisions n, the sort setting unit 16 sets the product yard 45 as a sorting destination of the cut material 302 located on the upstream side of the cutting position CP of the cutting machine main body 10. The setting information of the sort setting unit 16 is carried out to the carrying-out control unit 14. As a result, the carrying-out control unit 14 controls the product carrying-out device 40 to carry out the cut material 302 to the product yard 45.

In this manner, in the equal division cutting processing, all of the three cut materials 302, 310, and 320 are cut out as products. In this case, the two cut materials 310 and 320 corresponding to the product length l (2000 mm) and the one cut material 302 having a length (2046 mm) deviated from the product length l are obtained. Then, all of these cut materials 302, 310, and 320 are cut out as products and carried out to the product yard 45. That is, the product length that is cut for equal division cutting may include the allowable error.

When the equal division cutting processing is performed, the n-1 cut materials corresponding to the product length and the cut material corresponding to the remaining portion of the material are cut out as products. According to the first operation mode, all of the cut materials including the cut material corresponding to the remaining portion of the material can be sorted into the same place. As a result, all of the plurality of cut materials can be handled in a collective manner, thereby making it possible to improve working efficiency.

Note that in the embodiment described above, the cut material located on the upstream side of the cutting position CP of the cutting machine main body 10 is handled as the residual material after the final cutting, but the present invention is not limited to this. The residual material may be cut out first, or the residual material may be cut out while the product is being cut out. In this case, in the first operation mode, each of the cut material corresponding to the residual material and the cut material corresponding to the product is carried out to the product yard 45. Further, in the second operation mode, the cut material corresponding to the residual material is carried out to the residual material yard 30, and the cut material corresponding to the product is carried out to the product yard 45.

In the embodiment described above, the residual material yard 30 is arranged on the upstream side of the cutting machine main body 10. However, the residual material yard 30 may also be arranged on the downstream side of the cutting machine main body 10.

Further, in the embodiment described above, the first operation mode is executed in the case of the equal division cutting processing. However, the first operation mode may also be applicable to the normal cutting processing. Further, the aspect of the normal cutting processing is not limited to the form of cutting out, from one material, a plurality of products each having a certain product length l. The aspect of the normal cutting processing may also be a form of cutting out, from one material, a plurality of products having different product lengths l.

Further, in the present embodiment, the technique has been described in which all of the cut materials are sorted into the product yard out of the residual material yard 30 and the product yard 45, but the technique may be the one in which all of the cut materials are sorted into one product yard out of a plurality of product yards.

Further, the cutting method by means of the cutting machine 1 described above also functions as a part of the present disclosure.

The present disclosure is not limited to each of the embodiments described above, and various modifications can be made without departing from the summary of the present disclosure.

The disclosure of the present application is related to the subject matter described in Japanese Patent Application No. 2019-238739 filed on Dec. 27, 2019, all of which are incorporated herein by reference.

The invention claimed is:

1. A cutting method of cutting out a product having a predetermined product length from a material by using a cutting machine, the cutting method comprising:
    a first step of cutting, by the cutting machine, the material transported along a longitudinal direction of the material; and
    a second step of sorting and carrying out, by the cutting machine, a cut material cut from the material into any yard of a plurality of yards, wherein the plurality of yards include a product yard for accommodating the product and a residual material yard for accommodating a residual material of the material, when a predetermined first operation mode is selected, the second step causes all of a plurality of cut materials cut from the material to be carried out to the product yard, and when a predetermined second operation mode is selected, the second step causes a cut material corresponding to the product length to be carried out to the product yard and a cut material corresponding to the remaining portion of the material from which the cut material corresponding to the product length has been cut out to be carried out to the residual material yard, wherein the residual material yard is located on an upstream side of a cutting machine main body.

2. A cutting machine for cutting out a product having a predetermined product length from a material, the cutting machine comprising:
 a cutting machine main body configured to cut the material transported along a longitudinal direction of the material into a plurality of cut materials;
 a transport device configured to carry the material into the cutting machine main body and to sort and carry out each of the plurality of cut materials cut by the cutting machine main body into any yard of a plurality of yards; and
 a control device configured to control the cutting machine main body and the transport device, wherein
 the plurality of yards include a product yard for accommodating the product and a residual material yard for accommodating a residual material of the material,
 the control device is provided with a first operation mode for causing all of the plurality of cut materials to be carried out to the product yard and a second operation mode for causing a cut material corresponding to the product length to be carried out to the product yard and a cut material corresponding to the remaining portion of the material from which the cut material corresponding to the product length has been cut out to be carried out to the residual material yard, from among the plurality of cut material, wherein the residual material yard is located on an upstream side of the cutting machine main body, and the control device is configured to switch between the first operation mode and the second operation mode for execution.

3. The cutting machine according to claim 2, wherein the control device is configured to operate in the first operation mode when equal division cutting processing for cutting out the plurality of cut materials as a plurality of products is performed by cutting the material into equal divisions each including an allowable error.

4. The cutting machine according to claim 3, wherein, when the equal division cutting processing is performed, the control device is configured to
 obtain a material length that is a length of the material and a number of equal divisions into which the material is cut,
 calculate the product length based on the material length and the number of equal divisions;
 cut out, from the material, n−1 (n: the number of equal divisions) cut materials corresponding to the product length, and
 carry out, to the product yard, the n−1 cut materials corresponding to the product length and a cut material corresponding to a remaining portion of the material from which the n−1 cut materials have been cut out.

5. The cutting machine according to claim 4, wherein the cut material corresponding to the remaining portion of the material from which the n−1 cut materials have been cut out is a cut material present on an upstream side of a cutting position of the cutting machine main body in a transport direction of the material after a final cutting of the material.

6. The cutting machine according to claim 3, wherein, when the equal division cutting processing is performed, the control device is configured to obtain the product length and a number of pieces to be cut out from the material;
 cut out, from the material, n−1 (n: the number of pieces) cut materials corresponding to the product length; and
 carry out, to the product yard, the n−1 cut materials corresponding to the product length and a cut material corresponding to a remaining portion of the material from which the n−1 cut materials have been cut out.

* * * * *